(12) United States Patent
Bechtloff et al.

(10) Patent No.: US 11,844,973 B2
(45) Date of Patent: Dec. 19, 2023

(54) REMOTE MONITORING OF A PIPE NETWORK BY MEANS OF SENSORS

(71) Applicant: Minimax Viking Research & Development GmbH, Bad Oldesloe (DE)

(72) Inventors: Volker Bechtloff, Timmendorfer Strand (DE); Joachim Böke, Düsseldorf (DE)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 476 days.

(21) Appl. No.: 17/170,276

(22) Filed: Feb. 8, 2021

(65) Prior Publication Data

US 2021/0275849 A1 Sep. 9, 2021

(30) Foreign Application Priority Data

Mar. 6, 2020 (DE) ...................... 10 2020 106 193.5

(51) Int. Cl.
*A62C 37/50* (2006.01)
*H04W 76/10* (2018.01)
*G08B 21/18* (2006.01)

(52) U.S. Cl.
CPC .............. *A62C 37/50* (2013.01); *G08B 21/18* (2013.01); *H04W 76/10* (2018.02)

(58) Field of Classification Search
CPC .......... A62C 37/50; A62C 35/68; F24F 11/33; F24F 11/38; F24F 7/04; G08B 21/18; H04W 76/10
See application file for complete search history.

(56) References Cited

U.S. PATENT DOCUMENTS

| | | | |
|---|---|---|---|
| 7,266,992 B2 * | 9/2007 | Shamout | G01M 3/243 73/49.1 |
| 9,939,344 B2 * | 4/2018 | Bracken | G01M 3/243 |
| 10,094,732 B2 * | 10/2018 | Linford | G01M 3/243 |
| 10,387,590 B2 * | 8/2019 | Ba | G06Q 10/04 |
| 10,835,771 B2 | 11/2020 | Bechtloff et al. | |
| 10,948,377 B2 * | 3/2021 | Solomon | G01M 3/2815 |
| 11,691,042 B2 | 7/2023 | Hofmann et al. | |
| 2014/0332240 A1 | 11/2014 | Kochelek et al. | |

(Continued)

FOREIGN PATENT DOCUMENTS

| DE | 10 2016 201 235 A1 | 8/2017 |
|---|---|---|
| DE | 102019111612 | 11/2020 |
| EP | 3772728 | 10/2021 |

*Primary Examiner* — Elias Desta
(74) *Attorney, Agent, or Firm* — Perkins Coie LLP

(57) ABSTRACT

A system for monitoring a pipe network for a fire protection system having an evaluation unit with a communication device, and at least one sensor which is arranged on or within at least one pipe of a plurality of pipes of the pipe network and is in communicative signal connection with the communication device. The at least one sensor is configured to collect measurement data indicative of changes in a hydraulic condition of the at least one pipe and to transmit this measurement data to the communication device of the evaluation unit. The evaluation unit is configured to evaluate the measurement data based on assigning the at least one pipe to the specific pipe category in order to generate an evaluation data record indicative of the hydraulic condition of the at least one pipe.

15 Claims, 3 Drawing Sheets

(56) References Cited

U.S. PATENT DOCUMENTS

| | | |
|---|---|---|
| 2017/0100617 A1 | 4/2017 | Kochelek et al. |
| 2018/0320828 A1 | 11/2018 | Lander et al. |
| 2019/0009119 A1 | 1/2019 | Bechtloff et al. |
| 2019/0224511 A1 | 7/2019 | Cogswell et al. |
| 2019/0224512 A1 | 7/2019 | Goyette et al. |
| 2019/0224515 A1 | 7/2019 | Krutskevych |
| 2019/0247689 A1 | 8/2019 | Trivelpiece et al. |
| 2019/0247690 A1 | 8/2019 | Trivelpiece et al. |
| 2019/0247691 A1 | 8/2019 | Trivelpiece et al. |
| 2019/0362030 A1 | 11/2019 | Nikolayev et al. |
| 2021/0038936 A1 | 2/2021 | Hofmann et al. |

* cited by examiner

REMOTE MONITORING OF A PIPE NETWORK BY MEANS OF SENSORS

PRIORITY CLAIM AND INCORPORATION BY REFERENCE

This application claims the benefit of German Application No. 10 2020 106 193.5 filed Mar. 6, 2020, which is incorporated by reference in its entirety.

TECHNICAL FIELD

The present invention relates to a system and a method for monitoring a pipe network for a fire protection system.

BACKGROUND AND SUMMARY OF THE INVENTION

In this context, a fire protection system may correspond to any type of system that can be used for the purpose of fire protection in buildings, halls, rooms or similar. Such fire protection systems may include, but are not restricted to, fire extinguishing systems, spark extinguishing systems, smoke venting systems and/or a combination of these. Fire protection systems within the meaning of the invention may particularly correspond to systems which comprise a central device and one or more peripheral devices and/or components which are in communicative connection with the central device.

It is known that fire protection systems must comply with regulations which are described by corresponding specifications and/or guidelines. Such specifications and/or guidelines require, among other things, regular testing of the pipe wall thickness of the pipes of the fire protection system's pipe network, which are used to conduct the extinguishing fluid. The pipe wall thickness needs to be checked because corrosion can occur within the pipe network over time and this can reduce the pipe wall thickness. If this happens, leakage may occur. If there is a leak it can no longer be ensured that the extinguishing fluid is conducted through the pipe network to the extinguishing fluid outlets in sufficient quantity and with sufficient pressure in the event of a fire. As a result, the protection readiness of the fire protection system may be limited or no longer available.

A further check required by the corresponding specifications and/or guidelines is the checking of the incrustation of the pipe network's pipes. This allows for checking whether and, if so, at which position within the pipes there are incrustations, i.e. deposits. This means that the pipe network is monitored at specific locations, and the measurements can be used to determine where the deposit may be located. Deposits can lead to a reduction of the internal diameter of the pipe. This can have an effect, in a given time interval, on the flow volume of the extinguishing fluid through the pipe or pipes affected by deposits, and in particular reduce the flow rate through the pipe.

The VdS guideline CEA 4001 and the EN 12845 guideline are examples of such specifications and/or guidelines. These specify that in fluid systems the pipe wall thickness should be checked by ultrasound every 25 years and in dry systems after about 12 years, and that the incrustation should be checked by means of endoscopic examination, in order to ensure that any affected pipes can be flushed to remove the incrustations. In this way, the full functionality of the pipe network—and thus the protective readiness of the fire protection system—can be guaranteed.

In the state of the art, these checks are carried out by appropriate experts. They require manual measurement and opening of the pipe network to carry out the endoscopic examination. As a consequence, such checks are often time-consuming and costly, and while they are being conducted, the fire protection system is not in operation as usual.

Another disadvantage of these measurements according to the state of the art is that the measurements are only taken at relatively long intervals. In particular, there is no continuous measurement or measurement at short time intervals, which allows to draw conclusions on the evolution of the pipe network in terms of incrustation and/or corrosion. Thus, in the state of the art, corrosion and/or incrustation can often build up without being detected before leakage and/or loss of flow volume occurs.

Consequently, there are recurring efforts to develop a check that allows a continuous or quasi-continuous measurement, i.e. a measurement at shorter time intervals.

In this regard, US 2019/0224515 A1 discloses a method and system for measuring a flow rate in a sprinkler pipe network with the use of ultrasound. For this purpose, one or more ultrasonic-based flowmeters are placed inside the pipes of the pipe network to monitor the flow rate of the extinguishing fluid in the pipe network. The flow rates determined by several flowmeters within a pipe are compared with each other, and if they deviate from each other, leakage is suspected.

In addition, US 2019/0247689 A1, US 2019/0247690 A1, and US 2019/0247691 A1 disclose fire protection systems in which communication via microwave or radio frequency (RF) signals can be used. For this purpose, the pipes of the fire protection system are used as waveguides. These measurements can be used, among other things, to detect corrosion within the pipes, since the signature of the microwave signal changes when the properties of the waveguide—in this case the pipe—change. For this purpose, possible corrosion is determined using a comparison of a reference condition of the pipes, which is indicative of non-corroded pipes, with the actual condition of the pipe. Furthermore, the corrosion can be localized and categorized by signal processing.

The disadvantage of the state of the art in this respect is, on the one hand, that the state of the art does not provide a method with which both deposits and changes in pipe wall thickness can be determined simultaneously. Furthermore, the methods known from the state of the art are based on measurements that are complex and difficult to evaluate, such as flow measurements and wave guidance characteristics of a waveguide. A precise evaluation of these measurements requires a certain level of expertise, again requiring an expert or at least trained personnel to carry out the check. Furthermore, the use of flow measurements is not only complex but, in the case of extinguishing fluid systems, also unnecessarily costly, as such systems in general do not carry moving water. This means that, in order to carry out an appropriate flow measurement, the system would have to be triggered, as this is the only way to examine the individual pipes in the network. However, it is not desirable to trigger the system. Another disadvantage is that the state of the art requires that the measurement has to be carried out for each of the pipes in the pipe network in order to obtain as complete an overview of the condition of the pipe network as possible. This increases the complexity and the necessary effort even further.

Hence, it is desirable to provide a system and a method which allow for detecting changes in the pipe wall thickness of the pipes and deposits within the pipes and, in particular, also make it possible to distinguish between them. It is also desirable to provide a system and a method allowing these measurements to be carried out continuously, quasi-continuously and/or at short time intervals, so as to make it possible to follow the development of incrustation and/or corrosion over time and, if necessary, to take countermeasures, in particular against the deposits. It is also desirable to provide a system and a method, wherein these processes are carried out automatically to the greatest extent possible, in order to reduce the demands on the user (i.e. any type of person interacting with the fire protection system, for example the operator of the system, the installer of the system, a competent person maintaining or inspecting the system, etc., or similar persons) and also to make it possible to provide information on the effectiveness/readiness of the extinguishing system.

Against this background, it is an object of the present invention to provide a system and a method for monitoring a pipe network for a fire protection system, which does not have the disadvantages mentioned above. In particular, it is an object of the present invention to provide a system and a method by means of which both the deposits within the pipes of the pipe network and the corrosion of the pipes of the pipe network can be detected with reduced effort. It is a further object of the invention to provide a system and a method by means of which the development of incrustation and corrosion over time can be traced in order to initiate appropriate countermeasures before replacement of the pipes of the pipe network becomes necessary.

According to the invention, this object is achieved by a system for monitoring a pipe network for a fire protection system, comprising: an evaluation unit with a communication device, and at least one sensor which is arranged on or within at least one pipe of a plurality of pipes of the pipe network and is in communicative signal connection with the communication device, wherein the at least one pipe of the plurality of pipes is assigned to a specific pipe category of a plurality of pipe categories, and wherein the at least one sensor is configured to collect measurement data indicative of changes in a hydraulic condition of the at least one pipe and to transmit this measurement data to the communication device of the evaluation unit, wherein the evaluation unit is configured to evaluate the measurement data based on the assigning of the at least one pipe to the specific pipe category in order to generate an evaluation data record indicative of the hydraulic condition of the at least one pipe.

In particular, a pipe network is understood to correspond to a network of a plurality of pipes which serves to conduct an extinguishing fluid. Even more preferably, a pipe network is understood to correspond to an arrangement of a plurality of pipes which serves to conduct a liquid extinguishing fluid, such as water and/or water with additives, or the like. Preferably, the pipe network has a plurality of extinguishing fluid outlets from which the extinguishing fluid can escape in the event of a fire when the fire protection system is triggered.

In the present context, a sensor is understood to correspond to a sensor that is capable of detecting objects in a non-contact manner. It is particularly preferred that the sensor is implemented as a distance sensor. For this purpose, the sensor may be designed in different ways. In some embodiments, the sensor may preferably be a sonic sensor, particularly an ultrasonic sensor. However, the sensor may also work with other types of waves, especially longitudinal waves. For example, in some embodiments, the sensor may also use radio waves, microwaves, radar waves and the like.

The sensor is first "calibrated" for the respective pipe in order to be able to measure incrustations/corrosion. For this purpose, a target value is first determined or specified, i.e. a value that indicates how the pipe should look without incrustation and/or corrosion. For example, the distance between the sensor and the inner wall of the pipe, in particular the distance between the sensor and the section of the inner wall of the pipe opposite the sensor, may be used to determine this target value. After its initial determination, the target value is stored in such a way that the evaluation unit can access it. For each (regularly) performed measurement with the sensor, the value measured by the sensor, for example the distance value, is compared with the target value as part of the evaluation performed by the evaluation unit, as described in more detail below.

In some embodiments, the (distance) sensor may particularly be configured as an ultrasonic sensor for distance measurement. This means that the ultrasonic sensor can measure the distance between itself and an obstacle/object. Such a measurement may, for example, be carried out in particular according to the principle of travel time measurement. For this purpose, the ultrasonic sensor emits—preferably cyclically—ultrasonic wave pulses that travel at the speed of sound until they encounter an obstacle/object, such as an inner pipe wall. Here the ultrasonic pulses are reflected. This reflection is detected by a receiver in the ultrasonic sensor. The distance between the sensor and the object, i.e. the inner wall of the pipe, may be determined based on the time interval between the transmission and reception of the ultrasonic wave pulses. The initially measured target value to be set for this purpose may in particular be a travel time target value and/or a measured distance target value.

The system comprises an evaluation unit for evaluating the measurements of the at least one sensor. Such an evaluation unit is understood to correspond in particular to a processor which is configured by software means to evaluate the measurement data of the sensor. In some embodiments, the evaluation unit may be configured as part of a processor of a laptop computer. Alternatively, the evaluation unit may be implemented as a dedicated component configured for this purpose, such as a "corrosion/incrustation kit". Preferably, the evaluation unit is a mobile unit with an interface configured to communicate with the sensors as well as the peripheral devices and/or central devices of different fire protection systems. This also makes it possible to arrange the evaluation unit at different physical locations within a fire protection area covered by a fire protection system, in order to review the corresponding measured values directly in parallel with the evaluation of the measurements, for example. In other embodiments, the evaluation unit may also be implemented as a module of a central device such as a control center, for example, a fire alarm control center or extinguishing control center. In some embodiments, the evaluation unit may particularly be configured to communicate with a service device for a fire protection system, which may then in turn serve as interface to corresponding user terminals to allow the user to perform the check via remote monitoring. Such a service device is shown, for example, in DE 10 2019 111 612.0 or EP 19190740.1.

The communication device is preferably configured to establish the communication connection wirelessly and/or by means of a wired connection and/or by means of a combination of a wireless and a wired connection. This may be implemented using various different communication protocols. In some embodiments, these communication protocols are, for example, Bluetooth, LAN, WLAN, GSM, or the like. Preferably, the communication is wireless.

According to the invention, a sensor is arranged in or on a pipe of the pipe network for examining the hydraulic condition of at least one pipe.

A hydraulic condition is understood to mean, in particular, a condition that describes whether the examined pipe is still able to conduct the extinguishing fluid as desired, i.e. whether the pipe diameter has not yet been reduced too much by incrustations and/or whether extinguishing fluid is not leaking from the pipe, possibly due to corrosion, or similar. Determining the hydraulic condition of the pipe is thus understood to mean in particular determining whether there are deposits on the inner wall of the pipe, i.e. whether there are incrustations that limit the hydraulic functionality of the pipe network. Further, determining the hydraulic condition of the pipe is particularly understood to mean determining the pipe wall thickness of the pipe accordingly. Although the pipe wall thickness and possible incrustations are mentioned above as examples of factors influencing the hydraulic condition of the pipe, naturally, other factors may also play a role in the hydraulic condition of the pipe. For example, in certain cases, corrosion may not have progressed to the point where extinguishing fluid is leaking from the pipe, but may have already reached a degree where the inner wall of the pipe has been altered such that, for example, additives in the extinguishing fluid are deposited within the corroded areas and can no longer be reliably conducted through the pipe towards the extinguishing fluid outlet.

The evaluation unit preferably performs the evaluation of the measurement data based on an assignment of the at least one pipe in which the sensor is located to a specific pipe category from a plurality of pipe categories. In this context, a pipe category is to be understood in particular as a specification describing the properties of the pipe, such as for example diameter, length, material, pipe wall thickness, and the like. Assigning the pipe to a pipe category can be understood in particular as meaning that similar pipes, i.e. pipes with the same or very similar properties, are regarded as belonging to the same pipe category.

The degree of correspondence between the properties may be chosen individually, either by the user and/or by corresponding guidelines. This choice influences the accuracy of the monitoring in that case. Thus, for certain embodiments, it may be sufficient to assign all pipes of the same diameter to one pipe category, regardless of their different length or pipe wall thickness. This would lead to monitoring with reduced accuracy. In other embodiments, individual pipes may be assigned to the same pipe category if their diameter, pipe length, and pipe wall thickness matches within a certain threshold value. In this case, monitoring with improved accuracy could be ensured. In some embodiments, the assignment may also be done in such a way that even the slightest deviation between the properties of the pipes results in those pipes being assigned to different pipe categories. In extreme cases, this can lead to each pipe being assigned to its own pipe category.

The assignment can be done manually by the user. In some embodiments, the evaluation unit may also be configured to perform the assignment based on the properties of the pipes stored in the evaluation unit. In this case, the user can specify with which level of precision the division into pipe categories is to be carried out and/or the maximum number of pipe categories to be used, or similar. It should be noted at this point that the number of pipe categories, on the one hand, and the homogeneity of the pipes within a pipe category, on the other hand, have to be weighed against each other in order to obtain the most advantageous relation between complexity and accuracy of monitoring.

The at least one sensor is arranged on or within the at least one pipe. The term "arranged" can be broadly understood here to comprise sensors that can be navigated from one pipe into another—for example, by remote control—and can be arranged in different pipes. In this case, a station shall be provided for each sensor to which the sensor can return after performing the measurements. On the one hand, this facilitates the charging process of such a mobile sensor. On the other hand, it is specified that the sensor shall no longer be located within the fluid flow during a readiness state of the fire protection system, i.e. a state in which the fire protection system is ready for operation. In this embodiment, the sensor is thus arranged in the pipe.

Alternatively, the sensor may also be arranged on the inner wall of a specific pipe and may remain there in a fixed position to carry out the measurements. This has the advantage that each sensor can be assigned to a corresponding pipe, making it easier to locate any changes. The installation should preferably be carried out in such a way that the sensor is installed in an outlet of the pipe network, such as a tapping sleeve or socket. This can ensure that the sensor does not reduce and/or influence the fluid flow if the extinguishing system is triggered.

It is particularly preferred that the sensor is arranged on the pipe. The term "on the pipe" is to be understood as meaning that the sensor is arranged in particular on a pipe extension of the pipe, such as a tapping sleeve or socket. The advantage of this arrangement is that the attachment to a pipe extension makes it relatively easy to retrofit existing pipe networks. Furthermore, such an arrangement allows the inner wall of the pipe to be measured around the entire circumference, i.e. including on the pipe's "side that is opposite" to the sensor.

The one or more sensors are in communicative signal connection with the communication device of the evaluation unit in order to be able to transmit the measurement data determined by the sensor. In the case of a mobile sensor, the sensor further communicates its exact position and/or an identification of the pipe, in particular if the sensor is arranged inside the pipe.

For this purpose, the sensor carries out a measurement of the pipe to be measured by the sensor. It is assumed, in particular, that the occurrence of incrustations and/or corrosion evolves homogeneously within pipes of the same type, i.e. within pipes belonging to the same (installation) category. The sensors are then arranged in some pipes to be measured (for example one pipe per category). Preferably, this arrangement is made by means of a corresponding pipe extension, such as a tapping sleeve or socket. Next, a target value is defined per pipe or per category of pipes, i.e. a value that indicates how the pipe should look without incrustation and/or corrosion. This target value may be, for example, the distance between the sensor and the opposite wall, i.e. the diameter of the pipe minus the length with which the sensor protrudes into the pipe, but other target values may also be chosen.

The measurement is then carried out regularly, comparing the measured value with the target value. If the measured value (actual value) and the target value show a deviation that lies outside the measurement accuracy, it can be assumed that incrustation and/or corrosion is present. For example, an actual value that may be reduced when compared to the target value may indicate incrustation. An increase in the actual value may indicate a reduction in pipe wall thickness due to corrosion.

It should be noted with regard to this arrangement that, since incrustations preferably occur at locations within the pipe where the fluid collects, i.e. in the "bottom" region of the pipe in the direction of gravity, the sensor should preferably be mounted in such a way that it is arranged outside the region where the fluid collects within the pipe, i.e. preferably in the "top" region of the pipe in the direction of gravity.

The sensor then transmits the measurement data determined in this way to the communication device of the evaluation unit via a corresponding—preferably wireless—communication connection. The evaluation unit uses the measurement data to determine the condition of the pipe. In some embodiments, the evaluation unit determines in particular whether and if so to what extent incrustation/corrosion has been detected on the inner wall of the pipe and/or whether and if so to what extent the pipe wall thickness has changed. The evaluation unit is configured to generate a corresponding evaluation data record. This may comprise, in particular, the condition of the pipe, for example a deposit level and/or a pipe wall thickness, and a corresponding indication of the pipe whose condition has been determined.

In some embodiments, each pipe of the plurality of pipes of the pipe network may be assigned to a corresponding pipe category of the plurality of pipe categories, wherein a plurality of sensors may be arranged on or within a plurality of pipes. In this case, a sensor from the plurality of sensors may be assigned respectively to at least one pipe of a corresponding pipe category from the plurality of pipe categories. The evaluation unit may then be configured to evaluate the measurement data based on the assignment of each of the pipes of the plurality of pipes to the corresponding pipe category in order to generate an evaluation data record indicative of the hydraulic condition of all pipes of the corresponding pipe category.

Preferably, each pipe of the pipe network may be assigned to a pipe category, the number of pipe categories being less than the number of pipes. In this case, the system may be configured such that a sensor is arranged on or within one pipe respectively in a pipe category, such pipe serving as a representative pipe for this pipe category. In this way, it can be ensured that for each pipe category a "representative measurement", i.e. a measurement of one pipe which allows conclusions to be drawn about the hydraulic condition of the other pipes in this pipe category, is carried out.

In this case, the evaluation unit may preferably be configured to evaluate the measurement data based on the assignment to the pipe categories in order to output a corresponding evaluation data record indicating a representative hydraulic condition for each pipe category, namely the condition of the measured pipe. It may then be assumed that the other pipes of the corresponding pipe category have a very similar hydraulic condition.

The use of pipe categories is based on the realization that it is not advantageous to monitor each pipe individually and that in pipes of the same type, i.e. pipes of the same length and/or diameter and/or pipe wall thickness and/or with the same extinguishing fluid level, etc. corrosion and/or incrustation behave in approximately the same way. Thus, on the basis of these factors, pipes can be classified into different pipe categories. These pipe categories can then be used to draw conclusions about the other pipes in that category based on the measurement in a specific pipe. For this purpose, the evaluation unit takes into account the pipe category to which the pipe belongs when evaluating the measurement data and thus is able to output an evaluation data record which specifies the evaluation results for each pipe category. If there is incrustation/corrosion in a pipe of a pipe category, it is assumed that the other pipes of this pipe category also have a similar hydraulic condition.

Thus, by assigning the pipes to pipe categories, the number of sensors to be used can be kept low, since one sensor per pipe category is principally sufficient. This not only reduces the effort of installing the sensors and the number of measurements, but it also reduces the complexity of the evaluation.

Preferably, the evaluation unit comprises a classification device trained for the fire protection system on the basis of training data records, thus enabling an evaluation of the performance and/or operational readiness of the extinguishing system.

This evaluation is particularly necessary in modern extinguishing systems which use very small pipe diameters to conduct the quantity of extinguishing fluid required for fire protection operations, especially extinguishing operations. In this case, even minor incrustations can call into question the performance/effectiveness of the fire protection system, as these can already greatly reduce the effective diameter for conducting the extinguishing fluid.

In some embodiments, the evaluation unit may in particular comprise a classification device. In this context, a classification device is understood to be a device that can perform an evaluation of the measurement data by means of machine learning. Such a classification device may be implemented, for example, in the form of one or more neural networks or the like.

In this context, the term "training" is understood to mean, in particular, the use of a training data record which allows the classification device to distinguish between conditions of the fire protection system in which corrosion and/or incrustation have occurred and conditions in which there is no corrosion and/or incrustation. The training data record should allow the classification device to classify and/or put in relation to one another as many hydraulic parameters that could indicate corrosion and/or incrustation as possible. This allows the classification device to determine a target condition for the hydraulics of the respective system. For example, the evaluation unit comprising the classification device may also perform a performance evaluation. This may be done in particular based on whether the hydraulic condition of the pipes of the pipe network of the system still allows the required performance.

Preferably, measurement data and/or evaluation results can be added to the already existing training data records, where applicable together with a corresponding user input. Over time, this creates an extensive training base. Generalized empirical values may also be used as a training data record for other fire protection systems.

The advantage of this embodiment is that, even if the data records are incomplete, potential problems may be detected at an early stage because the evaluation unit bases the findings on training data records corresponding, among other things, to empirical values. For example, even in cases where measurement data are obtained from only some of the sensors and/or where measurement data reveal a previously unknown situation, a good estimate of the condition may already be obtained.

In a preferred embodiment, the communication device may comprise a wireless communication interface, and the communicative signal connection between the at least one sensor and the communication device may comprise a wireless signal connection.

In some embodiments, communication with the sensors may be wireless. Such wireless communication may be provided in particular via communication standards such as Bluetooth, infrared WLAN and/or a cellular network. In some embodiments, the sensors may also be configured to communicate with a corresponding repeater, whereupon the repeater communicates with the evaluation unit. In this case, as well, it may be said that a signal connection exists between the at least one sensor and the communication device.

In some embodiments, the at least one sensor is configured to periodically transmit the collected measurement data to the communication device of the evaluation unit at predetermined time intervals. In some embodiments, the predetermined time interval is set to transmit the collected measurement data quasi-continuously to the communication device of the evaluation unit.

Preferably, the measurement data are transmitted regularly (up to quasi-continuously) to the evaluation unit and are also evaluated there regularly (up to quasi-continuously). This makes it possible to trace the development of the conditions of the pipes over time. In this way, any problems that may occur can be detected at an early stage and eliminated, if necessary.

The time intervals at which the transmission is to take place may be set either manually by the respective user or automatically, for example by the evaluation unit. In some embodiments, the intervals may be adjusted in accordance with relevant specifications and/or guideline requirements. In some embodiments, the time intervals may also be adjusted to be system-specific. If, for example, a fire protection system shows increased corrosion and/or incrustation, the time intervals can be shortened.

Preferably, the hydraulic condition of the at least one pipe comprises a deposit level of a deposit within the pipe, the evaluation unit further being configured to determine if a predefined threshold value for the deposit level is exceeded and, in response to such determination, to output a deposit indication. In a modification of the above embodiment, the system further comprises a control unit configured to initiate a removal action in response to the deposit indication.

In some embodiments, the evaluation unit is configured to output an indication that the deposit level (i.e. incrustation) within a pipe is too high. In this context, the deposit level is understood to be the amount of deposits within the pipe, wherein the deposit level is too high and thus exceeds a threshold value if the hydraulic properties of the pipe, in particular the fluid properties of the extinguishing fluid in the pipe, are negatively influenced by this deposit, such that the performance and/or operational readiness of the fire protection system is no longer guaranteed. These threshold values may be determined in particular on the basis of empirical data. Alternatively or additionally, the limit values may be determined, for example, by means of a pipe network model simulation. This model may then be used to simulate the fluid dynamics in the pipe network.

Here, the term "output" is to be understood broadly. The term output may be understood to mean, in particular, an output of a warning notice to a user. In particular, it is preferred to output the notice—for example, via a remote connection—to a competent person who is a user of the system. This person can then assess within what timeframe, if any, a removal action needs to be carried out.

In some embodiments, the user may then, in response to the warning, (manually) initiate a removal action, in particular a flushing of the pipe network, before the deposits "settle". Alternatively or/additionally, the manual user input may in particular also cause antibiotics to be introduced into the pipe network.

Alternatively or additionally, the output may comprise an output to a control unit in the form of a warning and/or another output to the control unit. In this case, the removal action may be initiated automatically by a corresponding control unit. This allows for even more reliable deposit reduction, as there is no need to rely on any user interaction.

Preferably, the evaluation unit's evaluation of the measurement data comprises a simulation of the fluid dynamics in at least one pipe of the pipe network, taking into account the evaluation data record.

Since the pipes in the pipe network may have different diameters and the properties of the respective fire protection system may also vary between systems, the deposit level that is still acceptable may vary between pipes and between systems. Fluid dynamics simulations which simulate the hydraulic behavior of the extinguishing fluid may be carried out to enable a system-specific evaluation. This allows the detection of possible relevant deposits at an early stage and potentially the prediction of problems that may occur in the future.

Thus, if the fire protection system is a water extinguishing system, the hydraulics of the fire protection system can be determined according to Hazen-Williams as follows:

$$sp = \frac{6.05 \times 10^5}{C^{1.85} \times d^{4.87}} \times L \times Q^{1.85},$$

where p is a pressure drop along the pipe in bar, Q is a flow rate through the pipe in l/min, d is a mean inside diameter of the pipe in mm, C is a constant describing the pipe roughness, and L is an equivalent length of pipe and/or fittings in m.

With this formula, it is possible to assess on an individual basis whether the pipe diameter reduction resulting from deposits/incrustations still allows the necessary fluid quantity to be reliably conducted. It should be noted that a certain amount of deposit/incrustation is still acceptable in normal fire protection systems, since the pump delivering the extinguishing fluid generally delivers at a higher rate than necessary and the extinguishing fluid is thus still delivered sufficiently, even if there are a few deposits. However, if the deposits/incrustations generate excessive pressure losses at the pump, it is necessary to initiate removal measures in order to ensure the performance and/or operational readiness of the fire protection system.

In some embodiments, the system further comprises at least one data memory configured to store the evaluation result and/or the measurement data in a time-stamped manner.

In some embodiments, the evaluation result and/or the measurement data may be stored in a data memory. This storage is preferably done in a time-stamped manner. On the one hand, this makes it possible to trace which measurement data was measured and when it was measured. This makes it possible to trace the development of corrosion and/or incrustation over time, which can contribute to the early detection of potential problems.

Furthermore, time-stamped storage of the evaluation results and/or measurement data can also increase the security of the system. Thus, the time stamps allow for tracing whether the data memory has been accessed and the evaluation results and/or measurement data have been subsequently changed. This makes it possible to detect any unauthorized access.

In some embodiments, the system may further comprise at least one user terminal in communicative connection with the evaluation unit and/or with the at least one sensor, the user terminal comprising a graphical user interface and being configured to generate—and to display on the graphical user interface—a graphical representation of the evaluation data record and/or the measurement data, the user terminal further comprising a user input device configured to receive at least one user input in response to the displaying.

Preferably, the user is able to interact with the system, for example, to obtain information about the condition of the pipe network, to take removal actions if necessary, and the like. For this purpose, the evaluation unit is preferably configured to communicate with at least one user terminal, such as a laptop, a mobile phone, a tablet or the like. This communication may be wired or wireless.

For this purpose, the user terminal may comprise a graphical user interface and a user input device. The graphical user interface may display the measurement data and/or the evaluation results to the user. Alternatively or additionally, the graphical user interface may be configured to display the deposit indication and/or further information. The user input device thus serves to allow the user to make user inputs in order to interact with the system. This allows a quick reaction to possible problems within the pipe network.

In a preferred embodiment, the evaluation unit may be configured to communicate with the user terminal via a service device and/or may be configured as part of the service device. For this, the service device is configured to communicate with one or more user terminals over extended distances. This allows user interaction by an off-site user, thus opening up the possibility of performing certain user actions in the system remotely, such as viewing the measurement data and/or the evaluation data record.

In a further aspect, the present invention relates to a method for monitoring a pipe network for a fire protection system, comprising: arranging at least one sensor on or within at least one pipe of a plurality of pipes of the pipe network, the at least one sensor being in communicative signal connection with a communication device of an evaluation unit, assigning the at least one pipe of the plurality of pipes to a specific pipe category of a plurality of pipe categories, the at least one sensor collecting measurement data which are indicative of changes in a hydraulic condition of the at least one pipe, the at least one sensor transmitting the measurement data to the communication device of the evaluation unit, the evaluation unit evaluating the measurement data on the basis of the assignment of the at least one pipe to the specific pipe category, and the evaluation unit generating an evaluation data record which is indicative of the hydraulic condition of the at least one pipe.

In some embodiments, the method further comprises assigning each pipe of the plurality of pipes of the pipe network to one corresponding pipe category of the plurality of pipe categories, wherein a plurality of sensors are arranged on or within a plurality of pipes, wherein a sensor of the plurality of sensors is assigned to respectively at least one pipe of a corresponding pipe category of the plurality of pipe categories, and the evaluation unit evaluates the measurement data based on the assignment of each of the pipes of the plurality of pipes to the corresponding pipe category to generate an evaluation data record indicative of the hydraulic condition of all of the pipes of the corresponding pipe category. In some embodiments, the method further comprises receiving a user request at the evaluation unit and/or the sensors, and transmitting, in response to the user request, the measurement data to a user terminal for provision to the user.

In some embodiments, the system may be configured to transmit the measurement data also in response to an explicit user request made via the user terminal. This allows the user, for example a maintenance technician, to look at the measurement data and/or evaluation results again "upon request" and, if he is on site, to carry out a visual examination of the corresponding pipes, if necessary, in order to get an immediate picture of the condition of the pipes. For example, this allows the user to make adjustments to the evaluation unit to improve its operation.

The method according to the invention adopts the advantages and embodiments of the system according to the invention, which is why reference is made to the above explanations regarding these advantages and embodiments.

In another aspect, the present invention relates to a computer program having program code means which, when executed on a processor, causes the processor to carry out the method described above.

In a still further aspect, the invention relates to a fire protection system comprising a system as described above.

BRIEF DESCRIPTION OF THE DRAWINGS

The invention is described in more detail below with reference to the attached figures and using preferred embodiment examples.

MODE(S) FOR CARRYING OUT THE INVENTION

Figure 1:
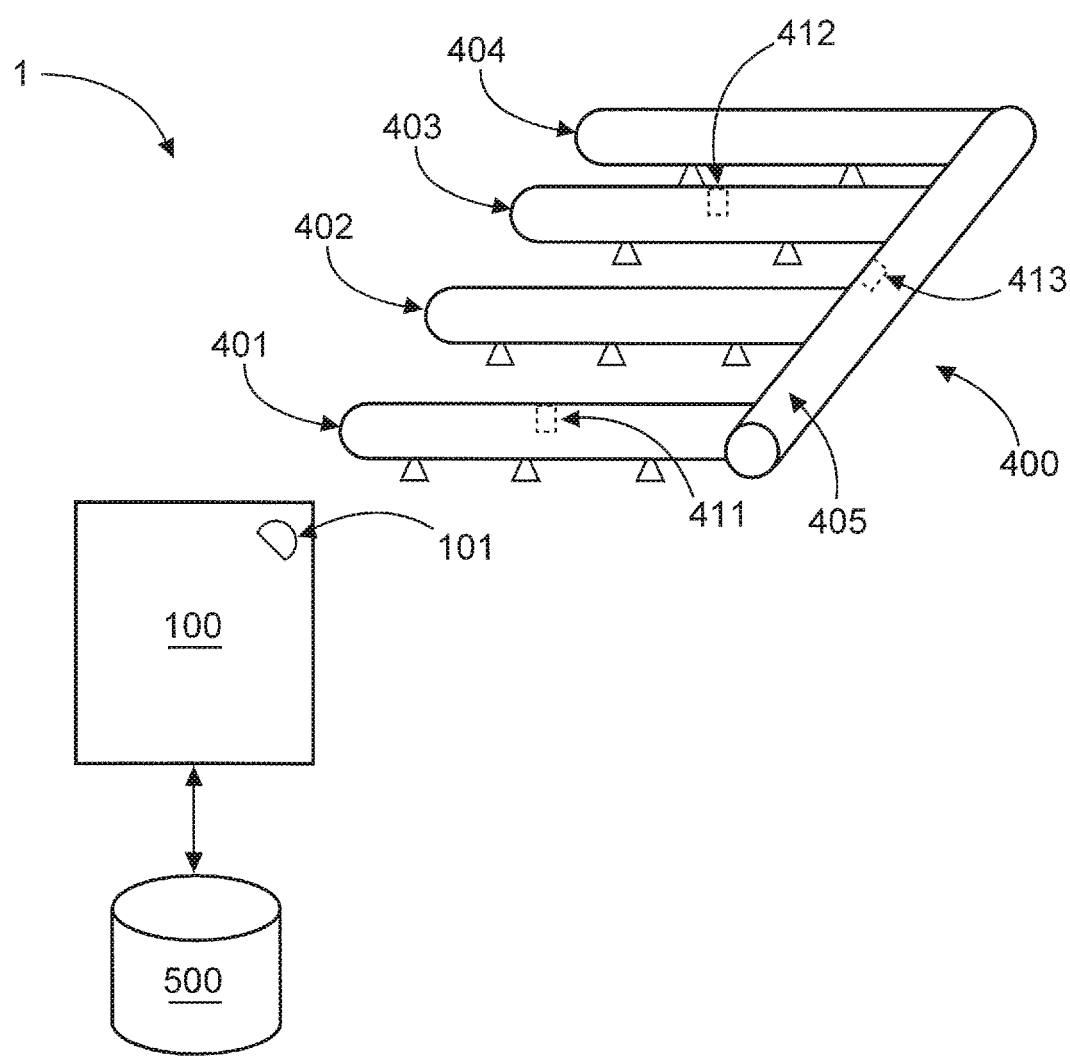
FIG. 1 is a schematic representation of a system architecture according to the invention in a first embodiment.

FIG. 1 shows a system architecture of a system 1 according to a first embodiment. The system 1 comprises an evaluation unit 100 with a communication device 101. The evaluation unit 100 is in communicative connection with a data memory 500. As one option, this communicative connection may be established by means of the communication device 101. Alternatively or additionally, the evaluation unit 100 may comprise a communication device configured specifically for this purpose (not shown).

In particular, the evaluation unit 100 may be configured to determine a predefined threshold value for a deposit level of a pipe, the deposit level being determined based on the pipe category. In some embodiments, the evaluation unit 100 is configured to store into and/or read from a memory corresponding threshold values for the minimum pipe cross-sections of the respective pipes for the corresponding pipe categories. These threshold values indicate the minimum pipe cross-section at which a pipe of a certain pipe category can still conduct sufficient extinguishing fluid, i.e. the minimum pipe cross-section that must exist for a pipe of a certain pipe category in order to guarantee the functionality of the system 1.

The system 1 further comprises a pipe network 400. The pipe network 400 comprises the pipes 401, 402, 403 and 404 and the pipe 405, which serves as a distribution line.

Although only five pipes are shown in the schematic representation of FIG. 1, it should be mentioned here that the pipe network 400 may also comprise fewer or more than five pipes. In the pipe network 400 according to FIG. 1, the pipes 401 and 402 have a similar length, diameter and pipe wall thickness and are thus assigned to the same pipe category 1. The pipes 403 and 404 also have properties comparable to one another and are thus assigned to the same pipe category 2. Furthermore, the pipe 405 is assigned to the pipe category 3.

The embodiment of FIG. 1 further shows the sensors 411, 412 and 413, which in the specific embodiment of FIG. 1 are designed as ultrasonic sensors 411, 412 and 413. In the specific embodiment of FIG. 1, the ultrasonic sensor 411 is arranged in the pipe 401 belonging to the pipe category 1. The ultrasonic sensor 412 is arranged within the pipe 403, which belongs to the pipe category 2, and the ultrasonic sensor 413 is arranged within the pipe 405, which belongs to the pipe category 3. Thus, due to the assignment of the pipes 402 and 404 to the pipe categories 1 and 2, respectively, conclusions about the hydraulic condition of these two pipes can also be drawn by means of the measurements for the pipes 401 and 403.

In the specific embodiment of FIG. 1, the arrangement of the ultrasonic sensors 411, 412 and 413 within the pipes 401, 403 and 405 is preferably accomplished by arranging the ultrasonic sensors 411, 412 and 413 in a tapping sleeve for the respective pipes. This allows for retrofitting of the ultrasonic sensors 411, 412 and 413 and/or simplified replacement or repair of the ultrasonic sensors 411, 412 and 413 in the event of failure.

In the specific embodiment of FIG. 1, the pipe network 400 is a pipe network for a fire protection system, in particular a sprinkler system. However, the present invention is also applicable to any other type of pipe network in which deposits may cause problems.

In the specific embodiment of FIG. 1, the system 1 is used to monitor the pipe network 400. For this purpose, the communication device 101 of the evaluation unit 100 is in signal communication with the ultrasonic sensors 411, 412 and 413. For this purpose, the ultrasonic sensors 411, 412 and 413 are configured to collect measurement data indicative of deposits on an inner wall of the respective pipe 401, 403 and 405 and to transmit this measurement data to the communication device 101 of the evaluation unit 100.

In the specific embodiment of FIG. 1, this transmission of the measurement data takes place at periodic time intervals of respectively one year. This means that all ultrasonic sensors 411, 412 and 413 transmit on an annual basis via the communication connection to the communication device 101 corresponding measurement data indicative of changes in the hydraulic condition of their respective pipes 401, 403 and 405, for example, of deposits within the pipes 401, 403 and 405 and/or changes in the pipe wall thickness of the respective pipes 401, 403 and 405. Alternatively or additionally, however, the system 1 may also be configured to transmit the measurement data at shorter or longer time intervals. For this, the individual ultrasonic sensors 411, 412 and 413 may also be timed such that, for example, the ultrasonic sensor 411 transmits its measurement data first, stops transmitting, and only then the ultrasonic sensor 412 and thereafter the ultrasonic sensor 413 transmit their respective measurement data. Thus, the transmission of the measurement data may be temporally stacked, making it easier to assign the measurement data to the ultrasonic sensors 411, 412 and 413 and their respective pipes and pipe categories, resulting in an easier assignment of the measurement data to their respective sensors 411, 412 and 413 and pipes 401, 403 and 405. However, in some embodiments, the measurement data from all ultrasonic sensors 411, 412 and 413 may be transmitted simultaneously, where such transmission occurs at predetermined time intervals.

The communication device receives the measurement data indicative of deposits on the inner wall of the respective pipe 401, 403 and 405 measured by the respective ultrasonic sensors 411, 412 and 413 and transmits this measurement data to the evaluation unit 100. The evaluation unit 100 is configured to evaluate the measurement data in order to generate an evaluation data record. In the specific embodiment of FIG. 1, the evaluation data record comprises in particular an indication of a deposit level of deposits on the respective inner pipe walls of the pipes 401, 403 and 405. Further, the evaluation data record comprises the assignment of the pipes 401, 403 and 405 to the corresponding pipe categories 1, 2 and 3, respectively. In the specific embodiment of FIG. 1, the evaluation data record further indicates the (estimated) deposit level for the pipe 402.

For this purpose, the evaluation unit assigns the pipe 402 also to the pipe category 1 and indicates that the deposit level of the pipe 402 will be similar to the deposit level of the pipe 401 due to the high degree of homogeneity with the pipe 401. Similarly, the evaluation data record indicates the (estimated) deposit level of the pipe 404. To this end, the evaluation unit assigns the pipe 404 to the pipe category 2 and indicates that the deposit level of the pipe 404 will be similar to that of the pipe 403 due to its similarity to the pipe 403. The evaluation data record may further comprise an indication of the pipe wall thickness. On the basis of the pipe wall categories, the pipe wall thickness, as well, may be determined not only for the actually measured pipe, but may be predicted for all pipes of the same pipe wall category on the basis of the measurement for the pipe actually measured.

The evaluation data record is then transmitted by the evaluation unit 100 to a data memory 500, if applicable, together with the measurement data and/or a time stamp and/or further information that can be used for monitoring the fire protection system, and in particular for monitoring the condition of the pipes of the pipe network 400 of the fire protection system.

In the specific embodiment of FIG. 1, the evaluation unit 100 is configured to store the evaluation data record, if applicable, together with the measurement data and/or the additional information in a time-stamped manner in the data memory 500. In the long term, this allows to generate a log of the deposit development within the pipe network 400 of the fire protection system.

Figure 2:
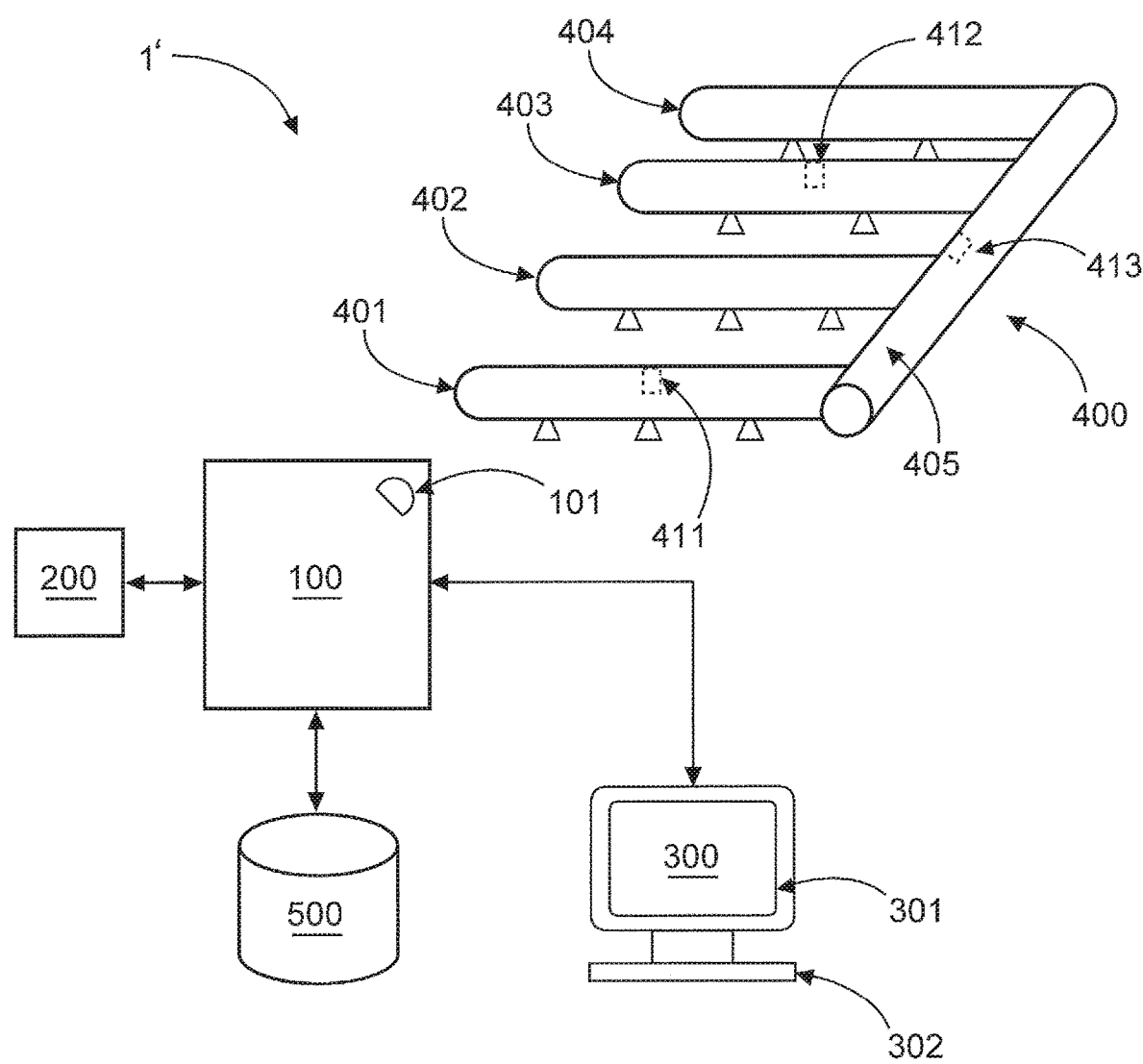
FIG. 2 is a schematic representation of a system architecture according to the invention according to an extension of the first embodiment.

FIG. 2 shows a system architecture of a system 1' according to an extension of the embodiment of FIG. 1. Identical elements of the system 1' are designated with the same reference numbers.

The system 1' also comprises an evaluation unit 100 with a communication device 101. In the system 1' the evaluation unit 100 is in communicative connection with a data memory 500, as well, wherein this communicative connection can be carried out either by means of the communication device 101 or with a communication device configured specifically for this purpose. The evaluation unit 100 is further in communicative connection with a control unit 200 as well as a user terminal 300 comprising a graphical user interface 301 and a user input device 302.

The system 1' also comprises a network of pipes 400 including the pipes 401, 402, 403, 404 and 405. In the specific embodiment of FIG. 2, corresponding sensors 411, 412 and 413 are arranged in the pipes 401, 403 and 405, which in the specific embodiment of FIG. 2 are designed as the ultrasonic sensors 411, 412 and 413. In the specific embodiment of FIG. 2, the arrangement of the ultrasonic sensors 411, 412 and 413 within the pipes 401, 403 and 405 is also preferably accomplished by arranging the ultrasonic sensors 411, 412 and 413 in a tapping sleeve for the respective pipes.

As already explained in connection with FIG. 1, the communication device 101 of the evaluation unit 100 is configured to communicate with the ultrasonic sensors 411, 412 and 413. Measurement data indicative of the condition of the respective pipes 401, 403 and 405, in particular indicative of deposits on the inner pipe wall and/or changes in the pipe wall thickness of the respective pipe 401, 403 and 405, can be transmitted via the communication connection between the communication device 101 and the respective ultrasonic sensors 411, 412 and 413.

The communication device 101 of the evaluation unit 100 receives this measurement data and the evaluation unit 100 evaluates the measurement data as described in connection with FIG. 1 to generate a corresponding evaluation data record indicative of the condition of the pipes 401, 403 and 405, and the pipes 402 and 404.

The evaluation unit 100 is further configured to store the evaluation data record in the data memory 500, if applicable, together with the measurement data. This storage is preferably done in a time-stamped manner so that a monitoring log of the pipe network 400 can be generated.

In the specific embodiment of FIG. 2, the evaluation result comprises in particular a deposit level for deposits on the inner wall of the corresponding pipe. The evaluation unit 100 is further configured to determine a predefined threshold value for a deposit level and to compare this to a deposit level determined on the basis of the measurement data. In the specific embodiment of FIG. 2, this predefined threshold value represents a maximum value for a deposit level at which it can still be assumed that the fluid flow through the corresponding pipe 401, 402, 403, 404 and 405 is not negatively affected. This means that if this predefined threshold value for the deposit level is exceeded, it must be assumed that a sufficient fluid flow through the corresponding pipe 401, 402, 403, 404 and 405 can no longer be guaranteed.

If, when comparing the threshold value with the actually determined deposit level, the evaluation unit 100 determines that such an exceedance of the predefined threshold value has occurred, the evaluation unit 100 is further configured to output a deposit indication. In the embodiment of FIG. 2, this deposit indication particularly comprises a notification that the deposit level within the corresponding pipe 401, 402, 403, 404 and 405 is so high that a satisfactory fluid flow can no longer be assumed. Here, the deposit indication can specifically indicate the pipe(s) in which the deposit level is too high. Alternatively or additionally, however, the deposit indication may also indicate the pipe category for which an excessive deposit level has been detected.

In the specific embodiment of FIG. 2, the evaluation unit 100 is thus configured to output this deposit indication to the user terminal 300. The user terminal 300, or rather its graphical user interface, is configured to generate and display a graphical representation of the deposit indication. The display of the graphical representation of the deposit indication may contain a notice to initiate a removal action. Alternatively or additionally, the graphical representation of the deposit indication may also contain a notification that the removal action has already been initiated. Alternatively or additionally, the deposit indication may include a list of pipes and/or categories of pipes affected by the deposit.

The evaluation unit 100 may be in communicative signal communication with a control unit 200 to initiate a removal action. In particular, the control unit 200 may be configured to receive the deposit indication from the evaluation unit 100 and to initiate a removal action in response to the deposit indication.

In the specific embodiment of FIG. 2, such a removal action is in particular a flushing of the pipe network 400 by which any deposits on the inner pipe walls of the affected pipes of the plurality of pipes 401, 402, 403, 404 and 405 can be removed. In some embodiments, the removal action in response to the deposit indication is fully automatic. In other embodiments, the removal action in response to the deposit indication does not take place until the control unit 200 receives a corresponding user input, in particular an acknowledgement by the user, via the user input device 302 of the user terminal.

When the removal action is complete, it is preferred that the ultrasonic sensors 411, 412 and 413 are used for re-measurement. The measurement data determined in this way is then transmitted back to the evaluation unit 100 by means of the communication device 101 and evaluated accordingly. This evaluation includes in particular a comparison with the specified threshold value. If, following the disposal action, the deposit level falls below this threshold value, the removal action is considered successful. If the threshold value has not yet been exceeded, a new disposal action may be carried out. Alternatively or additionally, an appropriate notice may be issued to the user terminal 300 that the pipe network is still not functional again. In such a case, it may be necessary to replace the pipe for which a very high deposit level has been determined or the pipes of the corresponding pipe category.

Although in the specific embodiment of FIG. 2, the graphical user interface 301 of the user terminal 300 is used to display the deposit indication, the graphical user interface 301 may also be configured to generate a graphical representation of the evaluation data record and/or the measurement data and display it to a user.

Furthermore, the evaluation of the measurement data by the evaluation unit 100 may be performed in a plurality of ways and may comprise a plurality of steps. In a specific embodiment of the invention, the evaluation of the measurement data by the evaluation unit 100 comprises in particular a simulation of the fluid dynamics of the fluid flow through at least one of the pipes 401, 402, 403, 404 and 405 of the pipe network 400, taking into account the measurement data and/or the evaluation data record. This means that the fluid dynamics simulation includes as boundary conditions of the simulation possible deposits on the inner pipe walls of pipes 401, 402, 403, 404 and 405 as well as possible changes in the pipe wall thickness. This allows to determine individually for each pipe, especially for each pipe category, whether the hydraulic condition of the respective pipes is still acceptable or not.

Figure 3:
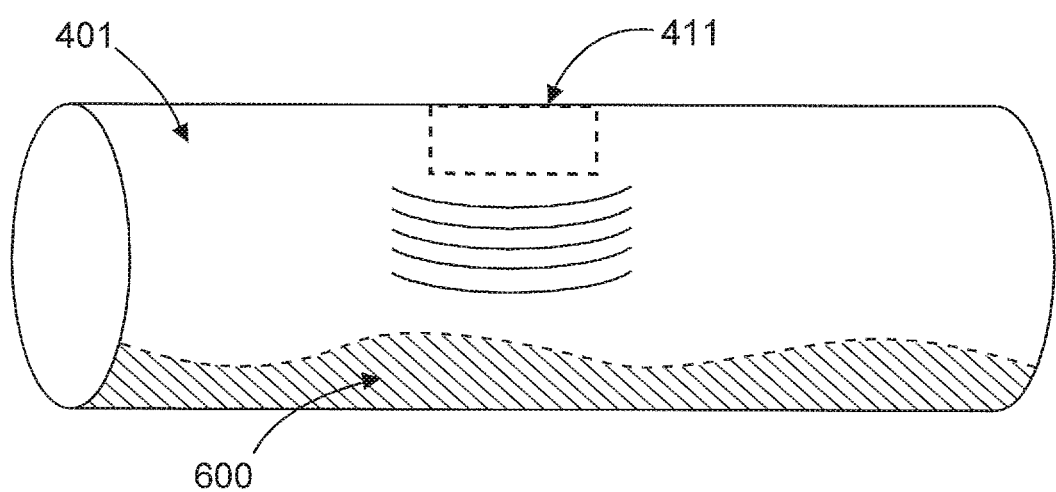
FIG. 3 is a schematic representation of the operation of an ultrasonic sensor according to the invention.

FIG. 3 shows a schematic representation of the operation of an ultrasonic sensor 411 that may be arranged within a pipe 401 of a pipe network 400. In the specific embodiment of FIG. 3, the ultrasonic sensor 411 is arranged on the inner wall of the pipe 401. However, it is to be understood that the ultrasonic sensor 411 could also be arranged in a tapping sleeve and/or a socket of the pipe 401. The ultrasonic sensor 411 of FIG. 3 includes an ultrasonic transceiver arranged in the top section of the pipe 401, as viewed in the direction of gravity. This arrangement in the top part is to be regarded as advantageous, since incrustations/deposits accumulate mainly in the bottom section of the pipe, as viewed in the direction of gravity.

In the specific embodiment of FIG. 3, the ultrasonic sensor 411 is configured as a distance sensor, which means that it can measure the distance between itself and an obstacle or an object. In the embodiment shown in FIG. 3, this distance measurement is carried out via a travel time measurement. This means, the ultrasonic sensor 411 comprises a transceiver configured to emit corresponding ultrasonic waves into the interior of the pipe. The ultrasonic waves propagate through the pipe until they encounter an obstacle and are then reflected by the obstacle. The ultrasonic transceiver receives the reflected ultrasonic wave. The distance is then measured by determining the time interval between the transmission and reception of the ultrasonic wave.

In order to be able to measure incrustations and/or corrosion, the ultrasonic sensor 411 is first adjusted for the respective pipe (and thus the pipe category) during installation. This means, a target value is determined or established which indicates the distance measured inside the pipe when there is no incrustation and/or corrosion. In the specific embodiment of FIG. 3, this target value is determined by determining the distance between the sensor and the opposite inner wall of the pipe, assuming that no incrustation and/or corrosion is present yet. The target value determined in this way is then stored for the corresponding pipe, and thus for the corresponding pipe category. In particular, this storage can take place in the data memory 500. Alternatively or additionally, a dedicated data storage may be used for this purpose. It is essential that the evaluation unit 100 is able to access the target value.

Once the target value has been stored, it can be retrieved each time a measurement is carried out with the ultrasonic sensor and be compared with the value measured by the ultrasonic sensor. This comparison can be carried out in particular as part of the evaluation by the evaluation unit.

In FIG. 3, the pipe 401 shows deposits 600 that shorten the distance between the opposite side of the inner wall of the pipe and the ultrasonic sensor 411. This means, the travel time of the sound waves towards the deposit 600 and back to the ultrasonic sensor 411 is shortened. The ultrasonic sensor 411 transmits this measurement to the evaluation unit 100, which then evaluates the measurement result. In the embodiment of FIG. 3, this means specifically that the evaluation unit 100 compares the travel time—and thus the measured distance—for the pipe 401 in the hydraulic condition with the deposit 600 with the target value for the distance and the associated travel time. If this comparison shows that the measured value deviates by more than a predetermined threshold value—which indicates the still acceptable deviation—this is noted in the evaluation data record. Furthermore, the evaluation unit generates and outputs a deposit indication. This deposit indication indicates that the pipe 401—and all pipes belonging to the same category as pipe 401—have a hydraulic condition in which the performance of the fire protection system can no longer be ensured. This allows initiating an appropriate removal action for all these pipes, either manually by the user or automatically.

If, on the other hand, the comparison shows that the measured value deviates by less than the predetermined threshold value, this is also noted in the evaluation data record, but no deposit indication is output. This allows to identify possible deposit trends of the affected pipes—i.e. all pipes of the corresponding pipe category—at an early stage and to react accordingly.

In this way, a more efficient and predictive monitoring of the incrustation and/or corrosion of the pipes of a pipe network can be established.

LIST OF UTILIZED REFERENCE NUMBERS

System 1, 1'
Evaluation unit 100
Communication device 101
Control unit 200
User terminal 300
Graphical user interface 301
User input device 302
Pipe network 400
Pipe 401, 402, 403, 404, 405
Ultrasonic sensor 411, 412, 413
Data memory 500
Deposit 600

The invention claimed is:

1. A system for monitoring a pipe network for a fire protection system, comprising:
   an evaluation unit with a communication device, and
   at least one sensor arranged on or within at least one pipe of a plurality of pipes of the pipe network and in communicative signal connection with the communication device,
   wherein the at least one pipe of the plurality of pipes is assigned to a specific pipe category of a plurality of pipe categories,
   wherein the at least one sensor is configured to collect measurement data which are indicative of changes in a hydraulic condition of the at least one pipe and to transmit said measurement data to the communication device of the evaluation unit, and
   wherein the evaluation unit is configured to evaluate the measurement data based on the assigning of the at least one pipe to the specific pipe category to generate an evaluation data record indicative of the hydraulic condition of the at least one pipe.

2. The system according to claim 1,
   wherein each pipe of the plurality of pipes of the pipe network is assigned to a corresponding pipe category of the plurality of pipe categories,
   wherein a plurality of sensors is arranged on or within the plurality of pipes, wherein a sensor of the plurality of sensors is assigned respectively to at least one pipe of a corresponding pipe category of the plurality of pipe categories, and
   wherein the evaluation unit is configured to evaluate the measurement data based on assigning each of the pipes of the plurality of pipes to the corresponding pipe category to generate an evaluation data record indicative of the hydraulic condition of all pipes of the corresponding pipe category.

3. The system according to claim 1, wherein the evaluation unit comprises a classification device which performs an evaluation of the fire protection system based on training data records.

4. The system according to claim 1, wherein the communication device comprises an interface for wireless communication, and wherein the communicative signal connection between the at least one sensor and the communication device comprises a wireless signal connection.

5. The system according to claim 1, wherein the at least one sensor is configured to transmit the collected measurement data periodically at predetermined time intervals to the communication device of the evaluation unit.

6. The system according to claim 1, wherein the hydraulic condition of the at least one pipe comprises a deposit level of deposits on an inner wall of the pipe, wherein the evaluation unit is further configured,
- to determine an exceedance of a predefined threshold value for the deposit level, and
- to output a deposit indication in response to the determining.

7. The system according to claim 6, further comprising a control unit configured to initiate a removal action in response to the deposit indication.

8. The system according to claim 1, wherein the evaluation of the measurement data by the evaluation unit comprises a simulation of fluid dynamics through at least one pipe of the pipe network, taking into account the evaluation data record.

9. The system according to claim 1, further comprising:
- at least one data memory configured to store the evaluation data record and/or the measurement data in a time-stamped manner.

10. The system according to claim 1, further comprising:
- at least one user terminal in communicative connection with the evaluation unit and/or the at least one sensor,
- wherein the user terminal comprises a graphical user interface and is configured to generate and display on the graphical user interface a graphical representation of the evaluation data record and/or the measurement data, and
- wherein the user terminal further comprises a user input device configured to receive at least one user input in response to the displaying.

11. A fire protection system comprising a system according to claim 1.

12. A method for monitoring a pipe network for a fire protection system, comprising:
- arranging of at least one sensor on or within at least one pipe of a plurality of pipes of the pipe network, wherein the at least one sensor is in communicative signal connection with a communication device of an evaluation unit,
- assigning the at least one pipe of the plurality of pipes to a specific pipe category of a plurality of pipe categories,
- collecting, by the at least one sensor, measurement data indicative of changes in a hydraulic condition of the at least one pipe,
- transmitting, by the at least one sensor, the measurement data to the communication device of the evaluation unit,
- evaluating, by the evaluation unit, the measurement data based on the assigning of the at least one pipe to the specific pipe category, and
- generating, by the evaluation unit, an evaluation data record indicative of the hydraulic condition of the at least one pipe.

13. The method according to claim 12, further comprising:
- assigning each pipe of the plurality of pipes of the pipe network to a corresponding pipe category of the plurality of pipe categories, wherein a plurality of sensors is arranged on or within a plurality of pipes, wherein a sensor of the plurality of sensors is assigned respectively to at least one pipe of a corresponding pipe category of the plurality of pipe categories, and
- evaluating, by the evaluation unit, the measurement data based on assigning each of the pipes of the plurality of pipes to the corresponding pipe category to generate an evaluation data record indicative of the hydraulic condition of all pipes of the corresponding pipe category.

14. The method according to claim 13, comprising:
- receiving a user request at the evaluation unit and/or the sensors, and
- transmitting, in response to the user request, the measurement data to a user terminal for provision to the user.

15. A computer program having program code means which, when executed on a processor, causes the processor to carry out the method according to claim 13.

* * * * *